(No Model.)

A. F. BLEASE.
VEHICLE DASH BOARD AND FENDER.

No. 520,388. Patented May 22, 1894.

WITNESSES:
J. A. Bergstrom
C. Sedgwick

INVENTOR
A. F. Blease
BY Munn & Co
ATTORNEYS.

THE NATIONAL LITHOGRAPHING COMPANY,
WASHINGTON, D. C.

UNITED STATES PATENT OFFICE.

ALMA F. BLEASE, OF HAMMOND, INDIANA.

VEHICLE DASHBOARD AND FENDER.

SPECIFICATION forming part of Letters Patent No. 520,388, dated May 22, 1894.

Application filed August 26, 1893. Serial No. 484,083. (No model.)

*To all whom it may concern:*

Be it known that I, ALMA F. BLEASE, of Hammond, in the county of Lake and State of Indiana, have invented certain new and useful Improvements in Vehicle Dashboards and Fenders, of which the following is a full, clear, and exact description.

The object of the invention is to provide certain new and useful improvements in dashboards and fenders for vehicles, whereby a strong and durable dash-board or fender is produced, and which can be readily applied to the vehicle.

The invention consists of certain parts and details and combinations of the same, as will be hereinafter described and then pointed out in the claims.

Reference is to be had to the accompanying drawings, forming a part of this specification, in which similar letters of reference indicate corresponding parts in all the figures.

Figure 1:
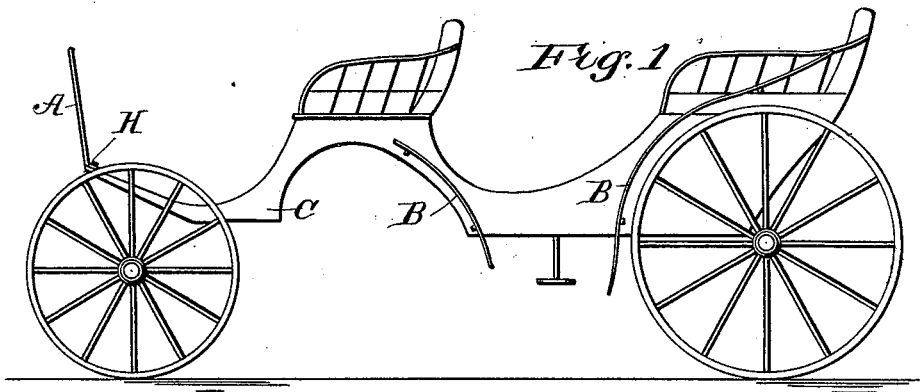
Figure 2:
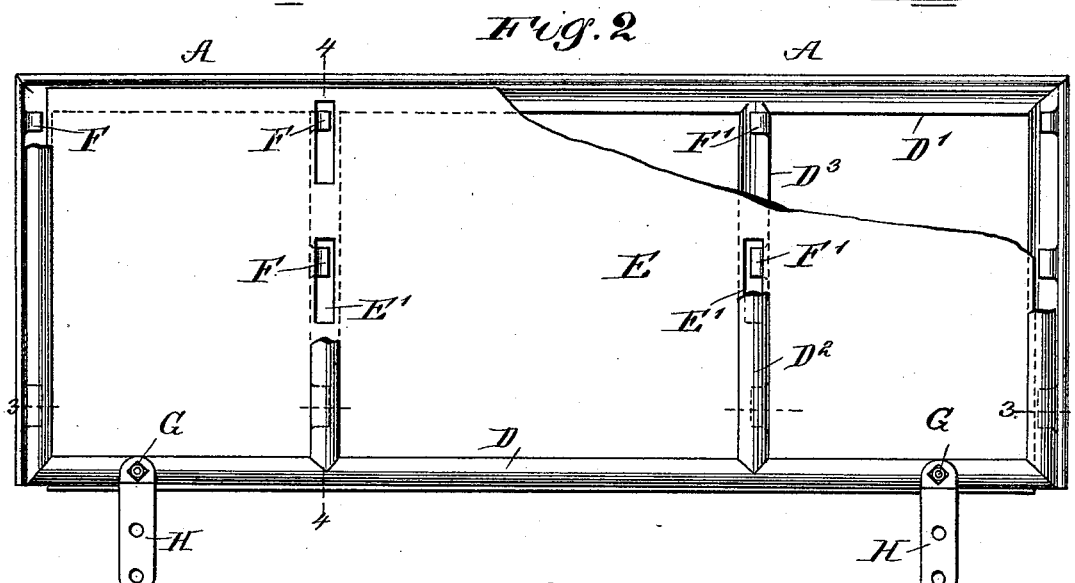
Figure 3:
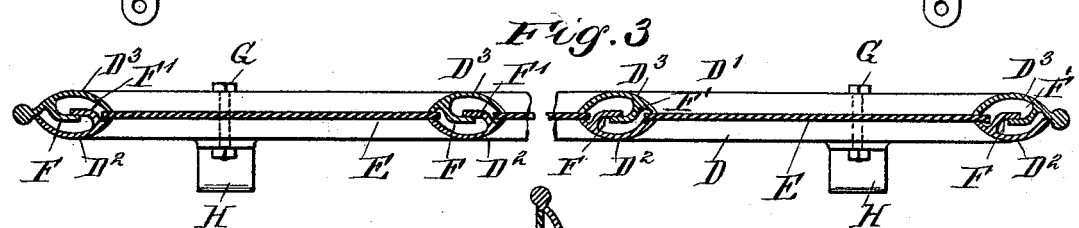

Figure 1 is a side elevation of the improvement as applied. Fig. 2 is an enlarged face view of the improvement arranged as a dash-board and with parts broken out. Fig. 3 is an enlarged sectional plan view of the same, on the line 3—3 of Fig. 2; and Fig. 4 is an enlarged transverse section of the same on the line 4—4 of Fig. 2.

As illustrated in Fig. 1, the dash-board A and the fenders B are attached to the vehicle C at their proper places, and as the dash-board and fenders are alike in construction, it suffices to describe but one.

Figure 4:
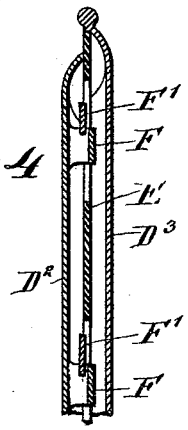

The dash-board A, as illustrated in Figs. 2, 3 and 4, is provided with a frame made of two sections D and D', between which a sheet E of leather, fabric or other suitable material is placed. The two frame sections D and D' are made of metal and preferably of concave bars, of which the vertical bars $D^2$, $D^3$ are provided at their inner or opposite faces with hooks F and F' respectively, arranged in such a manner that one can pass over the other by moving one section vertically upon the other, as indicated in Fig. 4. The sheet E terminates with its edges between the ends and sides of the open frame sections, so that the sheet is securely held in place and its edges do not protrude beyond the frame after the frame sections are fastened one upon the other by their respective hooks F and F'. The sheet E is formed with slots E' for the passage of the sets of hooks F, F', as plainly shown in Fig. 2, so that the hooks can readily engage one another when the frame sections are moved one over the other, as above explained. After the frame sections are fastened in position with the sheet E interposed between the sections, then bolts G are passed through the lowermost end of the frame, each bolt carrying a bracket H attaching the dash-board to the vehicle, as illustrated in Fig. 1. The brackets H are shaped according to the form of vehicle on which the improvement is applied; also, whenever the improvement is applied on a dash-board or on fenders, as illustrated in Fig. 1.

In case the sheet E becomes worn, the frame sections can be readily detached to remove the worn sheet and insert a new one after the frame sections are again fastened in place one upon the other, as above described.

Having thus described my invention, I claim as new and desire to secure by Letters Patent—

1. A dash board frame, comprising two sections provided with interlocking hooks, substantially as described.

2. A dash board frame, comprising two sections formed of concave bars, and provided on their inner faces with interlocking hooks, substantially as described.

3. A vehicle dash-board and fender, comprising a metallic frame made in two sections and formed with hooks on their opposite faces, the hooks being adapted to engage one another, and a sheet of leather, fabric or other material interposed between the frame sections and formed with slots for the passage of the said hooks, substantially as shown and described.

4. A vehicle dash-board and fender, comprising a metallic frame made in two sections and formed with hooks on their opposite faces, the hooks being adapted to engage one another, a sheet of leather, fabric or other material interposed between the frame sections and formed with slots for the passage of the said hooks, and bolts for uniting the frame sections and attaching a bracket to fasten the article to the vehicle, substantially as shown and described.

5. A vehicle dash-board and fender, provided with a metallic open frame made in two sections, and having bars made concave in cross section, each section being provided in its vertical bars with hooks adapted to engage the hooks of the other section, substantially as shown and described.

ALMA F. BLEASE.

Witnesses:
MARY E. JACKSON,
JOHN B. SMITH.